(No Model.)

P. J. PARKER.
VEHICLE WHEEL.

No. 595,130.  Patented Dec. 7, 1897.

WITNESSES:
Johna Bergstrom
C. R. Ferguson

INVENTOR
P. J. Parker.
BY
ATTORNEYS.

UNITED STATES PATENT OFFICE.

PHILIP JOHN PARKER, OF BROOKLYN, NEW YORK.

VEHICLE-WHEEL.

SPECIFICATION forming part of Letters Patent No. 595,130, dated December 7, 1897.

Application filed February 20, 1897. Serial No. 624,335. (No model.)

*To all whom it may concern:*

Be it known that I, PHILIP JOHN PARKER, of Brooklyn, in the county of Kings and State of New York, have invented a new and Improved Vehicle-Wheel, of which the following is a full, clear, and exact description.

This invention relates particularly to that class of wheels provided with pneumatic tires; and the object of the present invention is to provide a wheel with a tire so constructed that a puncture may be quickly located and suitable repairs made.

The invention comprises a tire made in independent sections forming the tread and having means whereby each section may be independently inflated or whereby all of the sections or a portion thereof may be inflated together.

The invention further consists in the construction and novel combination of parts and details, as will be hereinafter described, and pointed out in the appended claims.

Reference is to be had to the accompanying drawings, forming a part of this specification, in which similar characters of reference indicate corresponding parts in all the views.

Figure 1:
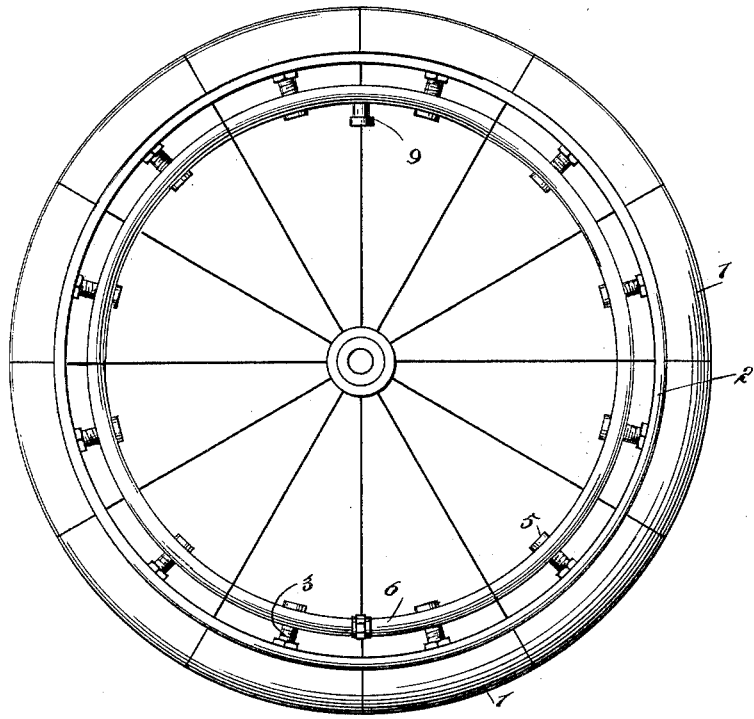
Figures 2, 3:
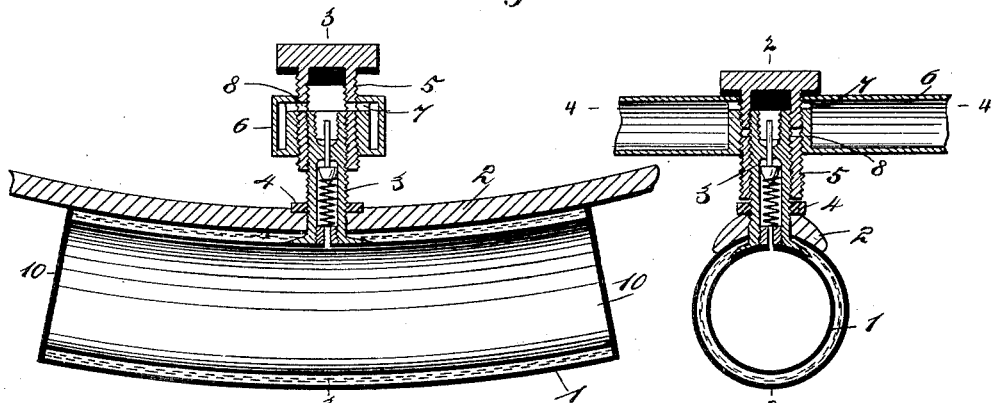
Figure 4:
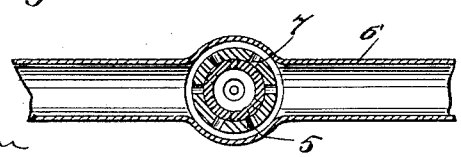

Figure 1 is a side elevation of a vehicle-wheel embodying my invention. Fig. 2 is a section on the line 2 2 of Fig. 3. Fig. 3 is a section on the line 3 3 of Fig. 2, and Fig. 4 is a section on the line 4 4 of Fig. 3.

The tire comprises a number of tubular sections 1, each made in the segment of a circle and closed at its ends. These several sections 1 are placed upon the rim 2, with adjacent ends closely abutting, so as to prevent the entrance of gravel or like material. Each section has a valve-tube 3 communicating with it. The valve-tubes 3 extend through openings in the rim 2 and have outwardly-flanged inner ends which engage against the inner surface of the sections. The tubes 3 are threaded on their outer sides, and nuts 4 engage with these threaded portions to lock the valve-tube rigidly in place. An interiorly-threaded thimble 5 engages with the exterior thread of the valve-tube 3, and these thimbles also have exterior threads which engage in tapped openings through an air-tube 6, extended around the inner side of the wheel-rim. At each valve the air-tube 6 has a series of ports 7, designed to be placed in line with ports 8, extended through the wall of the thimble 5.

When the parts are in the position indicated in Fig. 2, it is obvious that air pumped into the tube 6 will pass through the ports 7 and 8 and enter the tire-sections or any desired number thereof.

The tube 6 will be provided with a nipple 9 for engagement with a suitable pump. After inflating the tire or any desired number of the sections thereof the thimble 5 will be screwed down to the position indicated in Fig. 3, thus cutting off communication between the tube 6 and the interior of the tire-sections. By this construction it is obvious that should one of the sections of the tire be punctured the same may be easily located and removed and a new section put in its place. As these sections are comparatively short and light a desired number of extra ones may be carried by a person riding the vehicle.

The sections 1 will of course be made of suitable rubber or similar inflatable material, and, if desired, an outer covering may be placed over the several sections and laced in the usual manner. As the end closures 10 of the sections are of soft rubber it is obvious that the air in the sections will cause the ends of adjacent sections to bear closely together and thus prevent an outward spreading of the ends of the sections.

This wheel will be found useful not only for bicycles but for other wheeled vehicles—such, for instance, as sulkies, road-wagons, &c.

The pipe or tube 6 has its ends coupled together, so that it may be easily removed when desired.

Having thus described my invention, I claim as new and desire to secure by Letters Patent—

1. A vehicle-wheel, comprising a rim, a tire formed of a series of tubular sections having closed ends, an air-tube within the circumference of the rim and provided with openings from which ports lead into the tube, valves secured in the sections of the tire and provided with tubes projecting into the openings of the air-tube, and caps movable on the valve-tubes and provided with ports adapted to register with the ports of the air-tube, substantially as described.

2. A vehicle-wheel, comprising a rim, a tire consisting of a series of inflatable sections forming the tread of the tire, valve-tubes extended through the rim and into said sections, the said tubes being exteriorly threaded, interiorly and exteriorly threaded caps engaging with the threads of said tubes, the said caps being provided with ports, and an air-tube extended around within the circumference of the rim and having screw-threaded openings to be engaged by the exterior screw-threads of the caps, the said air-tube being provided with ports for registering with the ports of the caps, substantially as specified.

PHILIP JOHN PARKER.

Witnesses:
   JNO. M. RITTER,
   C. R. FERGUSON.